Figure 1:
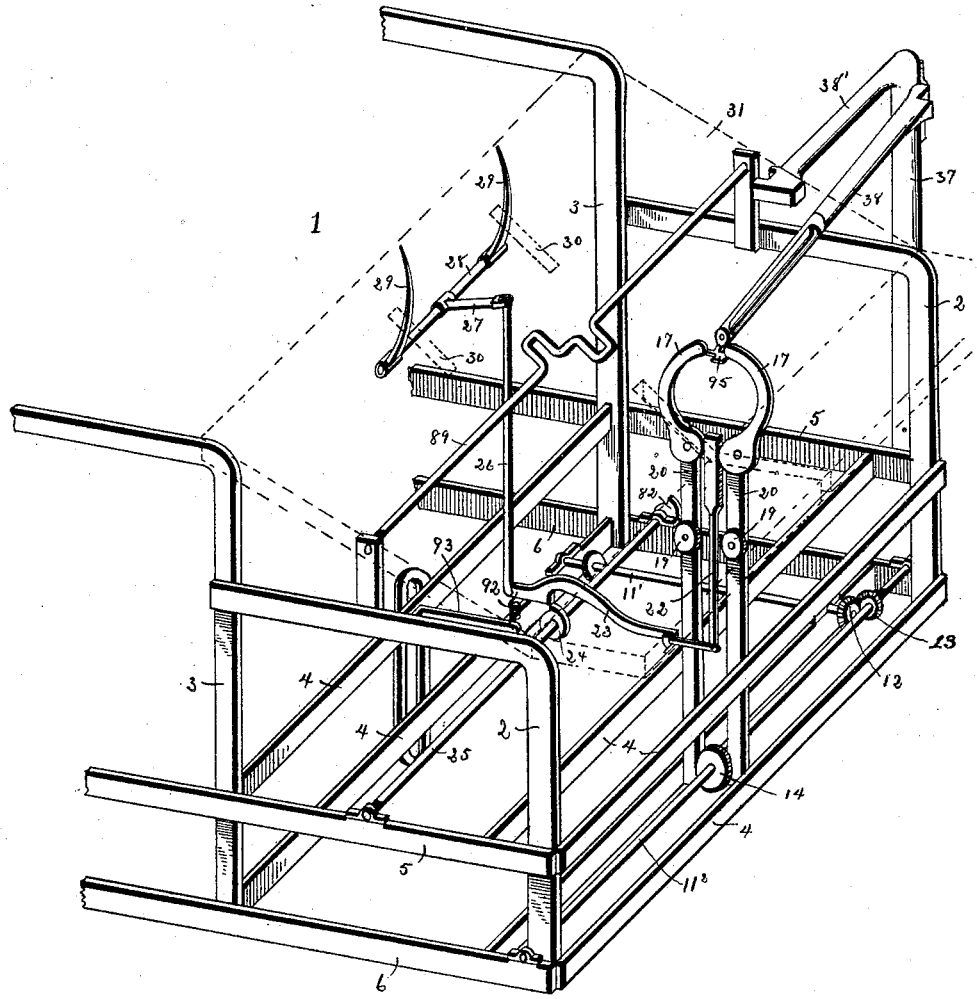

(No Model.) 6 Sheets—Sheet 1.
T. R. McDONALD.
GRAIN BINDER.

No. 452,980. Patented May 26, 1891.

WITNESSES
Carroll J. Webster.
R. W. Elliott.

INVENTOR
Theodore R. McDonald
By Myers & Webster
Attys (No Model.) 6 Sheets—Sheet 3.

T. R. McDONALD.
GRAIN BINDER.

No. 452,980. Patented May 26, 1891.

WITNESSES
Carroll J. Webster
R. M. Elliot

INVENTOR
Theodore R. McDonald
By Myers & Webster
Attys (No Model.)  6 Sheets—Sheet 4.

T. R. McDONALD.
GRAIN BINDER.

No. 452,980. Patented May 26, 1891.

WITNESSES
Carroll J. Webster
R. W. Elliott

INVENTOR
Theodore R. McDonald
By Myers & Webster
Attys (No Model.)  6 Sheets—Sheet 5.

T. R. McDONALD.
GRAIN BINDER.

No. 452,980. Patented May 26, 1891.

WITNESSES
Carroll J. Webster.
R. M. Elliott

INVENTOR
Theodore R. McDonald
By Myers & Webster
Attys

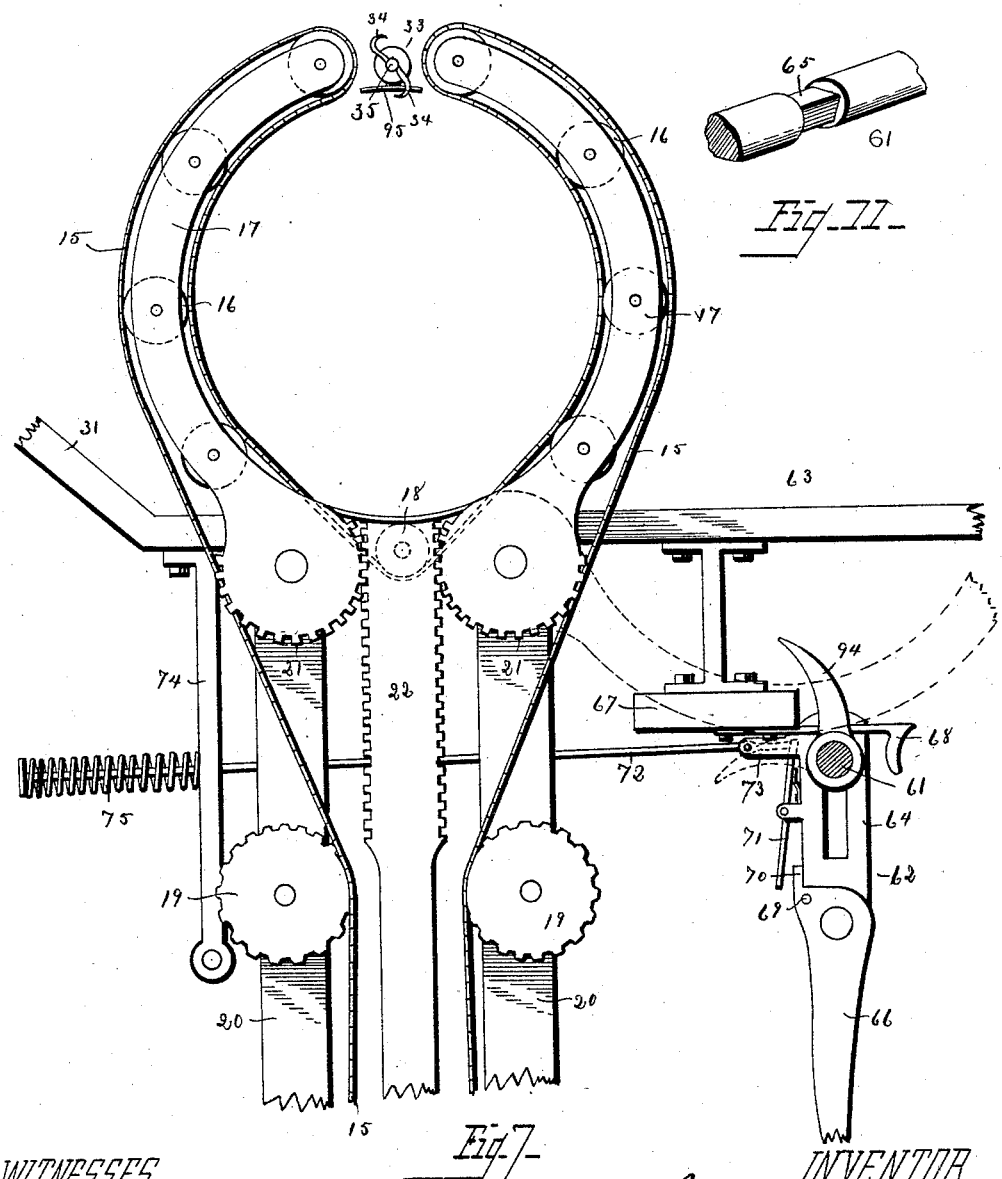

UNITED STATES PATENT OFFICE.

THEODORE R. McDONALD, OF MARION, OHIO, ASSIGNOR OF ONE-HALF TO HOWARD R. BOLANDER, OF SAME PLACE.

GRAIN-BINDER.

SPECIFICATION forming part of Letters Patent No. 452,980, dated May 26, 1891.

Application filed May 16, 1890. Serial No. 352,109. (No model.)

*To all whom it may concern:*

Be it known that I, THEODORE R. McDONALD, a citizen of the United States, residing at Marion, in the county of Marion and State of Ohio, have invented certain new and useful Improvements in Grain-Binders; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to grain-binders.

The object of the invention is to produce a device of the above description which will dispense with the ordinary cord or wire band, and in lieu thereof construct its own band from the grain of each bundle to be bound.

A further object is to produce a grain-binder which will construct its own band, tie the same around the bundle, and discharge the bundle from the machine.

A further object is to produce a grain-binder which shall be of great simplicity of construction, high efficiency and durability in use, and cheapness of production.

With these objects in view the invention consists in providing a grain-binder with a series of grain-compressors, carrying mechanism for imparting a rotary motion to the grain confined between the same, and a twister adapted to gather a sufficient quantity of the grain between the compressors to form a rope or band of adequate length to extend around the bundle.

The invention further consists in providing mechanism to operate in conjunction with the twister and compressors for securing the end of the band within the bundle and discharging the bundle from the machine.

The invention further consists in providing a series of packer-arms, a series of trips actuated by the pressure exerted by the packer-arms on the bundle, and mechanism actuated by the trips for ejecting the bundle from the machine.

The invention further consists in providing a series of fingers adapted to check the flow of grain, a series of compressor-arms adapted to compress and revolve the grain, and mechanism connecting the compressor-arms and fingers, whereby when a sufficient quantity of grain has been fed to the compressors the fingers will be actuated to prevent the further flow of grain thereto.

The invention finally consists in the various novel details of construction of a grain-binder, as will be hereinafter described in the specification, illustrated in the drawings, and more particularly pointed out in the claims.

In the accompanying drawings, forming part of this specification, and in which like numerals of reference indicate corresponding parts, I have illustrated one form of device embodying the essential features of my invention, although the same may be carried into effect in other ways without in the least departing from the spirit thereof.

Figure 2:
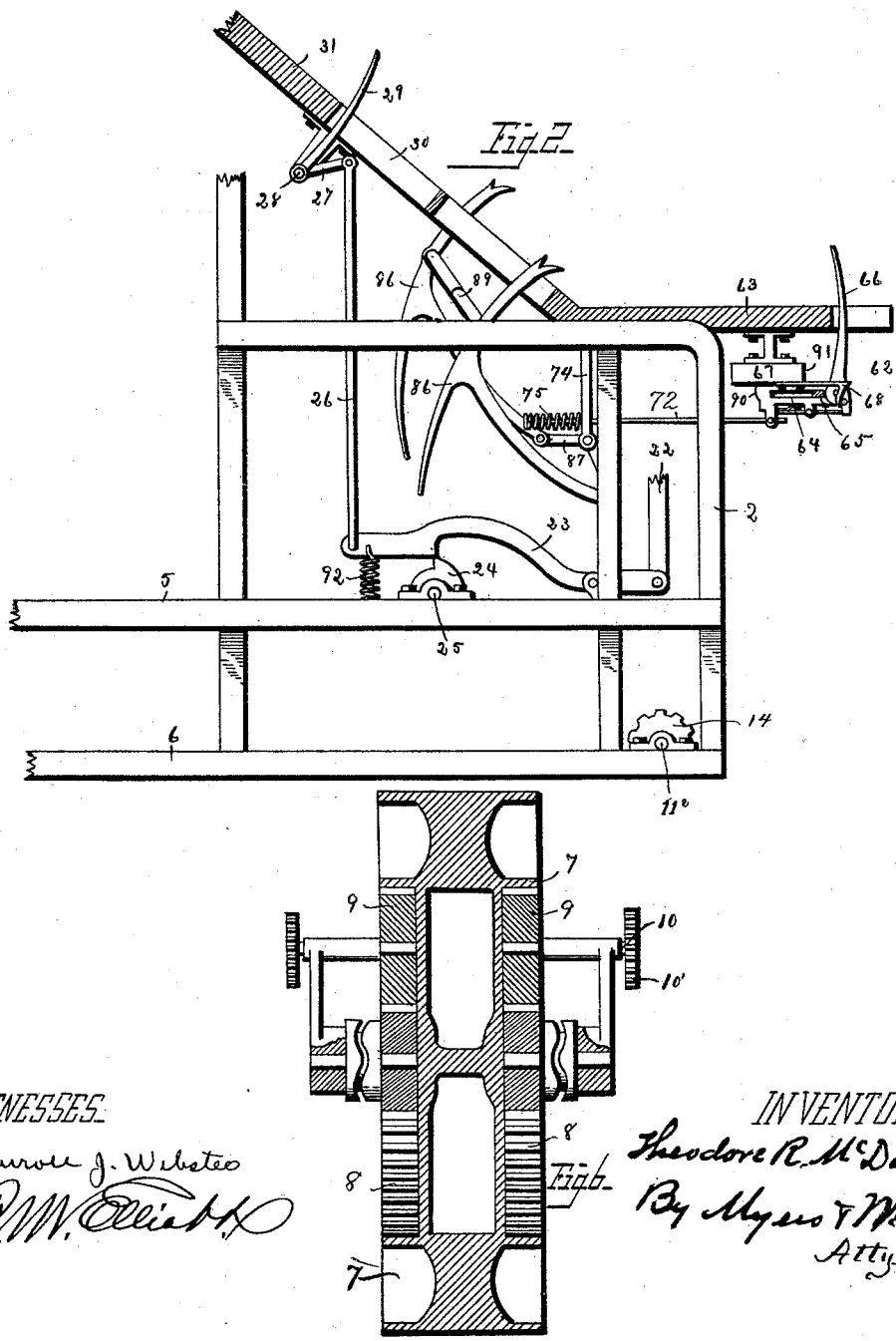
Figure 3:
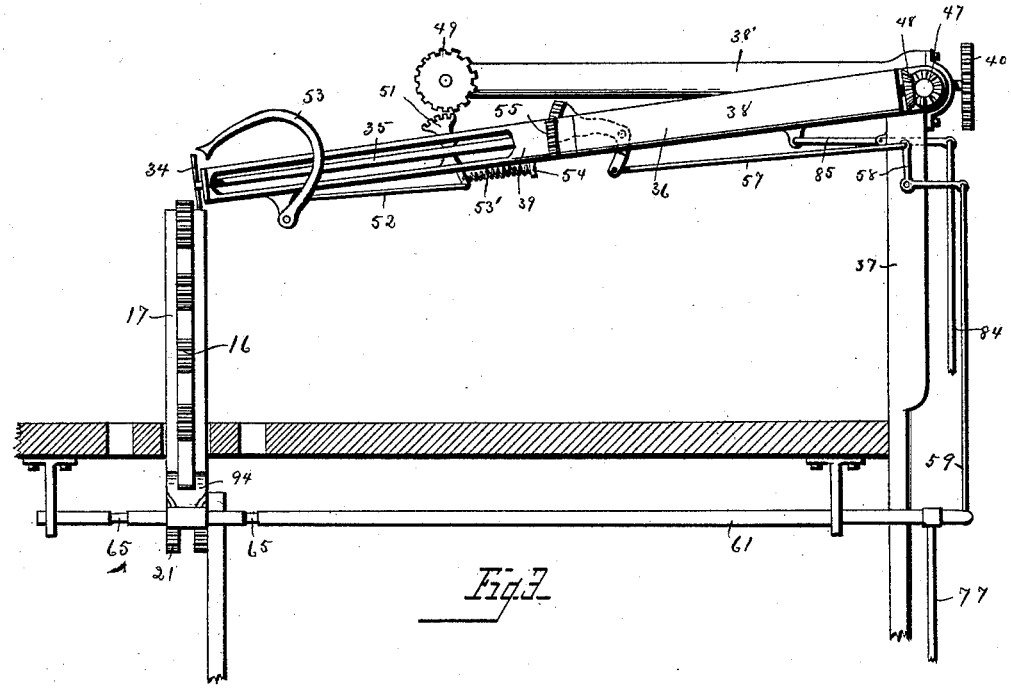
Figure 4:
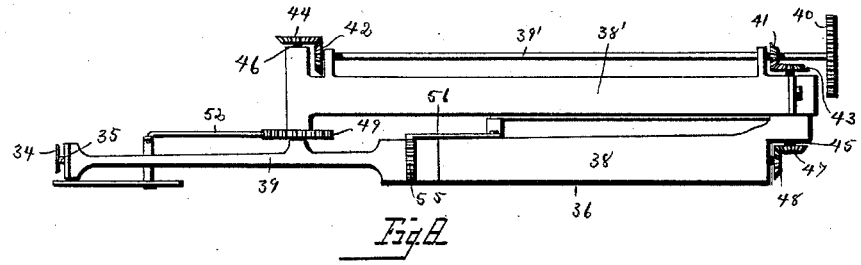
Figure 70:
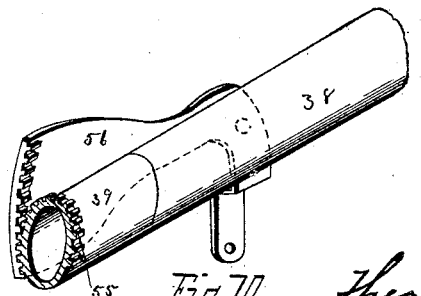
Figure 4:
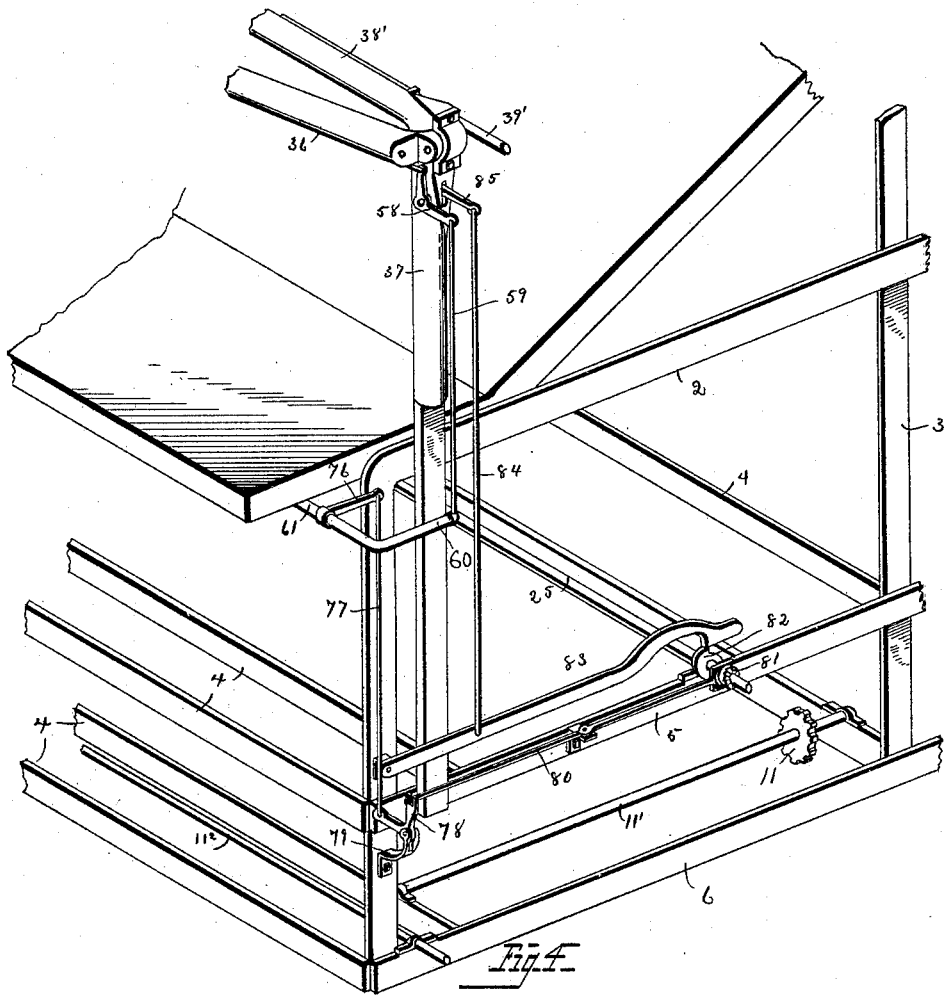
Figure 9:
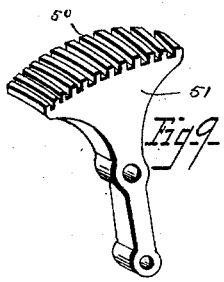
Figure 5:
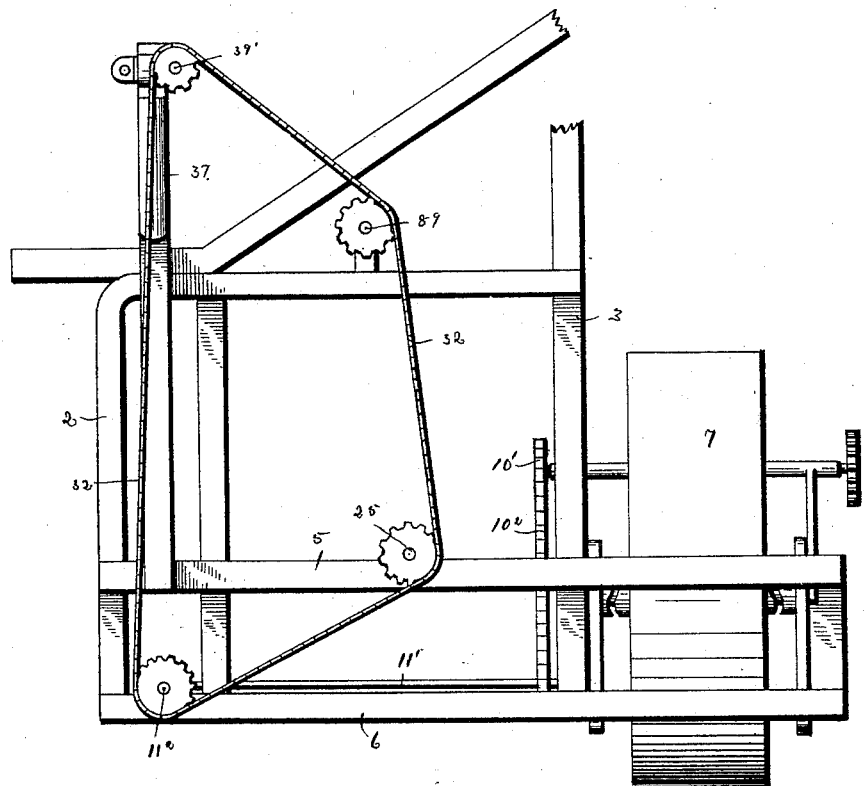

In the drawings, Figure 1 is a perspective view showing a portion of the frame, the compressor-arms, feed-regulators, twister-arm, and mechanism for operating the same, the packer-arms and trip mechanism being omitted. Fig. 2 is an end elevation, partly in section, showing the trip mechanism, packer-arms, and feed-regulators, the compressor-arms and twister-arm being omitted. Fig. 3 is a side elevation, partly in section, showing more particularly the mechanism for actuating the twister-arm and tucker. Fig. 4 is a perspective view, partly broken away, showing the clutch mechanism for stopping and starting the shaft-carrying mechanism for actuating the feed-regulators and compressor-arms. Fig. 5 is a front end view showing more particularly the chain for operating the grain-binding and other mechanism. Fig. 6 is a vertical sectional view of the bull-wheel. Fig. 7 is an enlarged side elevation of the grain-compressors. Fig. 8 is a top plan view of the twister-arm. Fig. 9 is a detail view of the toothed arm for operating the tucker. Fig. 10 is a perspective view of a portion of the twister-arm, showing the mechanism for imparting motion thereto to eject the finished bundle from the machine. Fig. 11 is a detail perspective view of a portion of the shaft carrying the trip-levers.

Referring to the drawings, 1 designates the frame, which is constructed of a metal, preferably of steel, consisting, essentially, of two angle-irons 2 and 3, forming the ends of the frame, longitudinal braces 4, and transverse braces 5 and 6 for holding the frame securely together. This frame may be arranged to have a lateral movement to admit of its being adjusted to grain of various lengths, so as to keep the band always in the center of the bundle, or, if desired, it may be made stationary.

Journaled within suitable bearings upon the frame is a bull-wheel 7, which imparts motion to the cutting apparatus and elevator. (Not shown in this instance, as they may be of any preferred form.) The bull-wheel is provided with an interior gear 8, which is engaged by a cog-wheel 9 upon a shaft 10, which latter carries a sprocket-wheel 10', transmitting motion through a sprocket-chain 10² to a sprocket-wheel 11 on the main shaft 11', which extends transversely across the machine.

Extending at right angles to the main shaft is another shaft 11², which receives its motion from the main shaft through bevel-gears 12 and 13, mounted, respectively, upon the said main shaft and counter-shafts. The counter-shaft carries a sprocket-wheel 14, around which passes a sprocket-chain 15 to and around a series of sprocket-wheels 16, carried by the compressor-arms 17 and to an idler 18, mounted between the said arms, the chain being held in proper position by means of the idler 18 and two idlers 19, journaled upon the uprights 20, which support the compressor-arms. The compressor-arms are constructed preferably semicircular in form, and each arm of two parts to admit of the sprocket-wheels 16 being journaled between the same, and their lower ends are provided with teeth 21, adapted to be engaged by a vertical reciprocating rack-bar 22, the function of which is to cause the grain-compressors to open and close at certain stages of the operation of binding the grain. The lower end of the rack-bar is pivotally connected with a lever 23, journaled upon one of the longitudinal braces 4, the said lever being adapted to engage a cam 24, carried by a shaft 25, journaled in the transverse braces 5. The end of the lever connects with the lower end of a rod 26, the upper end of which rod connects with an arm 27 upon a shaft 28, which shaft carries the feed-regulators 29, consisting of two upward curved arms or fingers adapted to work within slots 30, formed in the table 31. (Shown in dotted lines.) Motion is imparted to the shaft 25 by means of a sprocket-chain 32, which, as will be seen in Fig. 5, imparts motion to the entire operating mechanism, the function of which parts will be fully described farther on.

As stated in the first part of this specification, the object of this invention is to do away with the ordinary cord or wire band and produce a device which will make its own band from the grain to be bound. The mechanism for producing this result consists of a twister 33, which, as will be seen, is constructed of an approximately S-shaped arm 34, mounted upon a shaft 35, which extends through an arm 36, journaled upon a standard 37 on the frame, which arm is constructed of two parts— a stationary portion 38 and a revoluble portion 39. To the upper end of the standard 37 is secured a rigid arm 38', in which is journaled a shaft 39', carrying at its outer end a sprocket-wheel 40, which receives motion from the sprocket-chain 32. Upon this shaft is mounted two bevel-gears 41 and 42, which mesh, respectively, with bevel-gears 43 and 44, mounted upon shafts 45 and 46, journaled in the said arm.

Upon the shaft 45, and at the end opposite that carrying bevel-gear 43, is mounted a bevel-gear 47, which meshes with a similar gear 48, carried by the twister-shaft 35, and upon the shaft 46, at the end opposite that carrying bevel-gear 44, is mounted a gear-wheel 49, adapted to engage teeth 50 on an arm 51, pivoted upon the movable portion 39 of the twister-arm. The lower end of this arm has a pivotal connection with a rod 52, which in turn connects with a tucker 53, likewise pivoted upon the movable portion 39. The arm also connects with a coiled spring 53', secured to a lug 54 on the twister-arm. The inner end of the movable portion 39 of the twister-arm is provided with teeth, as shown at 55, which teeth are engaged by a toothed pivoted arm or segment 56, the lower end of which connects with a rod 57, connecting with one member of a bell-crank 58, the opposite member being engaged by a rod 59, the lower end of which connects with a crank 60, formed on the shaft 61. Upon the latter shaft are mounted the trip-levers 62, which when the grain-compressors are in their raised position, as shown in Fig. 1, are below the platform 63, and when the compressors are in their lowered position (shown in dotted lines, Fig. 7) the trip-levers are above the platform, as shown in Fig. 2. These levers are constructed of slotted plates 64, adapted to fit and slide upon the squared portion 65 of the shaft 61, and the fingers 66, which have a pivotal connection with the plates 64.

Upon the under side of the platform is secured a block 67, against which the long sides of the plates rest when in their inner position, and are thus locked to hold the arms 66 upright, the said block carrying brackets 68, adapted to engage pins or projections 69 upon the fingers 66. The lower ends of the fingers are provided with shoulders 70, adapted to be engaged by pivoted spring-actuated latches 71, carried by the plates 64 to hold the fingers in a vertical position or at right angles to the plates 64, as shown in Fig. 2, when the grain-compressors are down, and to release the fingers to permit the bundle to escape when the compressor-arms are being raised for the purpose of grasping another bundle to be bound.

The releasing of the fingers is accomplished in the following manner: As the grain is forced against the fingers 66 the latter are moved out, together with the plates 64, until the inner ends of the same reach the outer end of the block 67, when the plates slide off and are caused to resume the position shown in Fig. 7 by means of the rods 72, one end of each of which is pivoted within lugs 73 upon plates 64, while the opposite ends extend through standards 74, secured to the under side of the platform 63, and carry coiled springs 75, exerting a pressure the reverse of the movement of the trip-levers. As the fingers 66 drop the inner ends of the latches 71 contact with the outer ends of the rods 72 and throw them out of engagement with the shoulders 70 of the fingers, thus allowing the said fingers to assume the position shown in Fig. 7, in which position they remain until the compressor-arms are opened, in order to permit a fresh gavel to be formed. As the compressor-arms open one of them contacts with a rigid arm 94 on the shaft 61 and turns the same and throws the plates 64 up into the position shown in Fig. 2, which movement brings the pins 69 into engagement with the brackets 68 and turns the fingers to a vertical position, in which they are locked by the latches 71.

Upon the shaft 61 is secured an arm 76, carrying at its outer end a rod 77, connecting with one arm of a bell-crank 78, journaled in a support 79 on the frame, the other arm of the bell-crank being connected with a pivoted lever 80, which operates a clutch 81 on the shaft 25 for preventing the grain-compressors from opening until the twister has made a complete band. This clutch may be either a tooth-faced or frictional clutch; but as the latter is more rapid of operation than the former it is preferable in this case.

Upon shaft 25 is mounted a cam 82, which is adapted to be engaged by a lever 83, pivoted to one of the angle-irons of the frame. To this lever is connected a rod 84, the upper end of which connects with a lever 85, journaled upon the standard 37, and having a pivotal connection with the twister-arm 38. The function of the lever and cam is to elevate the twister-arm at predetermined intervals, so as to throw the tucker-operating mechanism into operative position to cause the end of the band to be secured within a bundle and the bundle discharged from the machine.

The packer-arms 86 may be of any preferred construction and are pivoted at one end to links 87, supported by the standard 74, and take motion from a crank-shaft 89, journaled in the frame, which shaft receives motion from the sprocket-chain 32, to which reference has been made.

Having described the different parts of my device, I will explain the manner of its operation. The grain is elevated in the usual manner to the table 31, down which it passes to the trip-levers 62, the feed-regulators 29 being below the surface of the table and the compressor-arms in the position shown in dotted lines in Fig. 7. The packer-arms catch the grain and force it against the trip-levers, thereby moving the latter out until the ends 90 of the plates reach the end 91 of the block 67, when the plates will slide off and drop into the position shown in Fig. 7. During the operation of packing the bundle to be bound and previous to the releasing of the trip-levers the lever 23 is bearing upon the concentric surface of the cam 24, being held in operative position thereon either by means of gravity or by spring-pressure, the latter being preferred, in which event the spring 92 is secured to an arm 93 upon the frame; but just as the levers are tripped the lever 23 contacts with the eccentric surface of the cam, thus raising the said lever, which motion draws down the rack-bar 22, causing its teeth, by meshing with the teeth on the compressor-arms, to raise the latter into their raised or closed position, as shown in Figs. 1 and 7, thus compressing the grain, while the sprocket-chain 15, which is being constantly revolved, imparts a positive rotary motion to the bundle between the arms. At the instant that the trip-levers drop the shaft 61, by means of rods 57 and 59 and bell-crank lever 58, rocks the segment 56, which turns the shaft 39, carrying the tucker one-quarter of a revolution, thus bringing the tucker into proper position, the ejecting of the previous bundle having left it turned to one side. As soon as the compressor-arms are closed the twister, which constantly revolves, begins its operation of forming a band by catching up a certain number of the straws in the bundle and twisting them into a band as the bundle is revolved, which will be readily understood from the fact that the twister revolves in a direction the opposite of the bundle. When a complete revolution has been made, the eccentric surface of the cam 82 passes under the lever 83 and allows it to drop, thereby drawing down upon the rods 84 and 85 and lifting the twister-arm until the toothed arm 51 is brought in contact with the gear-wheel 49, which is constantly revolving, which contacting will move the arm in the direction indicated by the arrow, thus causing the tucker-arm to be driven forward and drive the end of the band into the bundle, thereby securing it in place. As the tucker-arm reaches the lowest point of its stroke the cam 24 reaches the point to raise the lever and throw up the rack-bar, which movement opens the compressor-arms. In opening the said arms exert a pressure upon a rigid arm 94 upon the shaft 61 and throw the trip-levers into operative position again and at the same time turn the shaft 61, thereby drawing down the crank 60, and, through the medium of the rod 59 and bell-crank 58, drawing back toothed arm 56, which movement will cause the front portion of the twister-arm to be moved a quarter of a turn, and with it the tucker, which is still engaging the bundle, and thus eject the bundle from the machine, at the same time throwing the arm 51 out of engagement with the gear 49, so as to allow the spring 53 to draw the tucker back in its raised position. In order to prevent the twister taking up too much grain, a plate 95 is provided, which is secured to the outer end of the arm 36, and is cut away, so as to allow the twister to revolve freely, as shown. This plate also performs the function of preventing the grain from working out between the upper ends of the compressor-arms. As the shaft 61 is turned, the rod 77 is actuated to throw the clutch 81 out of engagement, and thus stops the further rotation of the shaft until such a time as the trip-levers are tripped, which movement will again throw the clutch into operative position to cause the compressor-arms to close.

Having thus fully described my invention, what I claim as new, and desire to secure by Letters Patent, is—

1. In a grain-binder, a pair of compressor-arms carrying sprocket-wheels, a sprocket-chain engaging the said wheels, and mechanism for imparting a rotary motion to the chain independently of the said arms, in combination with a rotatable arm carrying a twister and a tucker, and mechanism actuated by the opening of the compressor-arms to turn the rotatable arm and eject the bound gavel from the machine.

2. In a grain-binder, the combination of a series of feed-regulators, a pair of pivoted compressor-arms having teeth on their lower ends, a rack-bar engaging the said teeth, a lever pivotally secured at one end to the rack-bar and at the opposite end to a bar connecting with the feed-regulators, and a cam engaging the said lever and operating to reciprocate the rack-bar to open and to close the compressor-arms and also to raise and lower the feed-regulators.

3. In a grain-binder, the combination of a pair of compressor-arms, mechanism carried thereby for revolving the grain independently of the said arms, a pivoted arm, a rotatable arm mounted thereon, a twister and a tucker carried by the rotatable arm, a toothed arm pivoted on the said rotatable arm and connecting with the tucker, a rigid arm carrying a constantly-revolving gear, a cam adapted to bring the toothed arm into engagement with the said gear for projecting the tucker downward, and mechanism actuated by the opening of the compressor-arms for turning the rotatable arm and with it the tucker to eject the gavel from the machine.

4. In a grain-binder, the combination of a pair of compressor-arms, mechanism carried thereby for revolving the grain independently of the said arms, a pivoted arm, a rotatable arm mounted thereon carrying a twister and a tucker, a shaft, a rigid arm mounted thereon in the path of travel of one of the compressor-arms, a sector carried by the pivoted arm and engaging teeth on the rotatable arm, and mechanism connecting the shaft and sector, whereby when the compressor-arms are opened the rotatable arm and with it the tucker will be turned to eject the bound gavel from the machine.

5. In a grain-binder, the combination of a pair of compressor-arms, mechanism connecting therewith to cause them to open and to close at predetermined intervals, a pivoted arm, a rotatable arm mounted thereon, a twister and a tucker carried by the rotatable arm, mechanism for causing the tucker to confine the end of the band within the bundle, and mechanism actuated by the opening of the compressor-arms to cause the rotatable portion of the pivoted arm to turn and thus actuate the tucker to eject the bundle from the machine.

6. In a grain-binder, a pair of compressor-arms having teeth on their lower ends, a rack-bar meshing with the teeth, a series of feed-regulators, a lever connecting the rack-bar and feed-regulators, and a shaft carrying a series of trip-fingers, in combination with a series of packer-arms designed to force the grain against the trip-fingers to cause the same to drop, a cam adapted at predetermined intervals to actuate the lever and the rack-bar to open the compressor-arms, and a rigid arm mounted on the trip-shaft and designed to be engaged by one of the compressor-arms in opening, whereby the said trip-fingers will be raised.

7. In a grain-binder, the combination of a pivoted arm, a rotatable arm mounted thereon carrying a twister and a tucker, a stationary arm carrying a train of constantly-revolving gears, one set of which operates the twister and the other set at predetermined intervals the tucker, a series of compressor-arms, mechanism carried thereby for revolving the grain independently of the said arms, and mechanism for bringing the tucker-operating mechanism into contact with the gear for operating the same to cause the said tucker to confine the end of the band within the bundle and discharge it from the machine.

8. In a grain-binder, the combination of a pivoted arm, a rotatable arm mounted thereon carrying a tucker and a twister, a cam, mechanism connecting the cam and pivoted arm, whereby the arm may be raised at certain intervals to move the twister out of contact with the bundle, a sector carried by the pivoted arm and engaging teeth on the rotatable arm, and mechanism for operating the said sector to cause the rotatable arm to turn.

9. In a grain-binder, the combination of a pair of pivoted compressor-arms provided near their pivotal points with teeth, a vertically-reciprocating rack-bar adapted to engage the said teeth to open and to close the said arms, an idler carried by the said bar, and a sprocket-chain carried by the said arms and engaging the idler, whereby the chain is held in proper position with relation to the arms.

10. In a grain-binder, the combination of a pair of pivoted compressor-arms provided near their pivotal points with teeth, a vertically-reciprocating rack-bar engaging the said teeth to open and to close the arms, sprocket-wheels carried by the arms, an idler carried by the rack-bar, and a sprocket-chain engaging the said sprocket-wheels and the idler.

In testimony that I claim the foregoing as my own I hereby affix my signature in presence of two witnesses.

THEODORE R. McDONALD.

Witnesses:
M. A. PAYNE,
JONAS CONCKLIN.